United States Patent
Ho

(10) Patent No.: US 6,863,414 B2
(45) Date of Patent: Mar. 8, 2005

(54) FRONT LIGHT MODULE

(75) Inventor: Yi-Chun Ho, Chung-Ho (TW)

(73) Assignee: Quanta Display Incorporation, Taipei Hsien (TW)

( * ) Notice: Subject to any disclaimer, the term of this patent is extended or adjusted under 35 U.S.C. 154(b) by 0 days.

(21) Appl. No.: 10/330,594

(22) Filed: Dec. 27, 2002

(65) Prior Publication Data

US 2004/0125588 A1 Jul. 1, 2004

(51) Int. Cl.[7] ................................................ F21V 7/04
(52) U.S. Cl. ............................ 362/31; 362/27; 362/33; 362/327; 362/349
(58) Field of Search ............................. 362/27, 31, 33, 362/327, 349; 385/146

(56) References Cited

U.S. PATENT DOCUMENTS

| | | | | |
|---|---|---|---|---|
| 5,769,522 | A | * | 6/1998 | Kaneko et al. ................ 362/31 |
| RE38,243 | E | * | 9/2003 | Oe et al. .................... 359/619 |
| 6,644,823 | B2 | * | 11/2003 | Egawa et al. ................. 362/31 |
| 6,692,133 | B2 | * | 2/2004 | Katsu et al. .................. 362/31 |
| 2003/0214719 | A1 | * | 11/2003 | Bourdelais et al. ......... 359/599 |

* cited by examiner

Primary Examiner—Stephen Husar
Assistant Examiner—Anabel Ton

(57) ABSTRACT

A front light module includes a light guide plate having opposite ends and a front surface and an opposite back surface connected to each other by the ends. The front surface forms sets of raised ridges, each raised ridge having opposite inclined faces. The front surface also forms a recessed trough between adjacent sets of ridges. Each trough has opposite inclined faces. A light source is mounted to each end of the light guide plate for projecting a light into the light guide plate. A reflector is arranged adjacent to and spaced from the back surface of the light guide plate for accommodating a display board between the reflector and the light guide plate. The light from the light source is incident onto the inclined faces of the troughs and reflected thereby toward the reflector. The troughs have different depths whereby the inclined faces thereof are of different surface areas for reflecting different amount of light in order to provide a uniform brightness over the whole module. The light is then reflected by the reflector toward the front surface where the light is refracted by the inclined faces of the ridges to increase the viewing angle of the light guide plate. The ridges may have a triangular cross section or alternatively, the ridges have a trapezoidal cross section having a top face forming ribs. The troughs may have a trapezoidal cross section having a flat bottom face that allows for adjustment of distance between adjacent ridge sets.

17 Claims, 8 Drawing Sheets

FRONT LIGHT MODULE

FIELD OF THE INVENTION

The present invention relates generally to a planar light source device, and in particular to a front light module having high luminance, uniform brightness and wide viewing angle.

BACKGROUND OF THE INVENTION

Planar light source devices are known in the prior arts such as Japan Patent Laid Open Nos. 21883/2001, 00017/1990 and 84618/1990. These known devices have certain disadvantages such as insufficient brightness and limited viewing angle. The present invention is aimed to provide a front light module that overcomes the above problems encountered in the prior art techniques.

FIG. 1A of the attached drawings shows a conventional front light module and FIG. 1B particularly shows a light guide plate of the conventional front light module. The conventional front light module, generally designated with reference numeral 900, comprises a light guide plate 901 having a step-like light emitting surface 902 and an opposite back surface 903 and end surfaces 904 (only one being visible in the drawings) connecting between the light emitting surface 902 and the backs surface 903. A light source 905 is arranged adjacent to each end surface 904 of the light guide plate 901 and light 920 emitted from the light source 905 travels into the light guide plate 901 via the end surface 904. Each step of the light emitting surface 902 has an inclined riser face 906 by which the light 920 from the light source 905 is reflected toward and through the back surface 903, as indicated by reference numeral 921, to reach a reflector 930 located adjacent to the back surface 903. As mentioned above, the conventional design has the drawback of a narrow viewing angle, which does not meet the requirement for general consumer products.

SUMMARY OF THE INVENTION

An object of the present invention is to provide a front light module that has a wide viewing angle.

Another object of the present invention is to provide a front light module that has uniform and sufficient brightness throughout the whole module.

A further object of the present invention is to provide a front light module having reduced weight and size and minimizing energy loss.

To achieve the above objects, in accordance with the present invention, there is provided a front light module comprising a light guide plate having opposite ends and a front surface and an opposite back surface connected to each other by the ends. The front surface forms sets of raised ridges, each raised ridge having opposite inclined faces. The front surface also forms a recessed trough between adjacent sets of ridges. Each trough has opposite inclined faces. A light source is mounted to each end of the light guide plate for projecting a light into the light guide plate. A reflector is arranged adjacent to and spaced from the back surface of the light guide plate for accommodating a display board between the reflector and the light guide plate. The light from the light source is incident onto the inclined faces of the troughs and reflected thereby toward the reflector. The troughs have different depths whereby the inclined faces thereof are of different surface areas for reflecting different amount of light in order to provide a uniform brightness over the whole module. The light is then reflected by the reflector toward the front surface where the light is refracted by the inclined faces of the ridges to increase the viewing angle of the light guide plate. The ridges may have a triangular cross section or alternatively, the ridges have a trapezoidal cross section having a top face forming ribs. The troughs may have a trapezoidal cross section having a flat bottom face that allows for adjustment of distance between adjacent ridge sets.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE INVENTION

Figure 1:
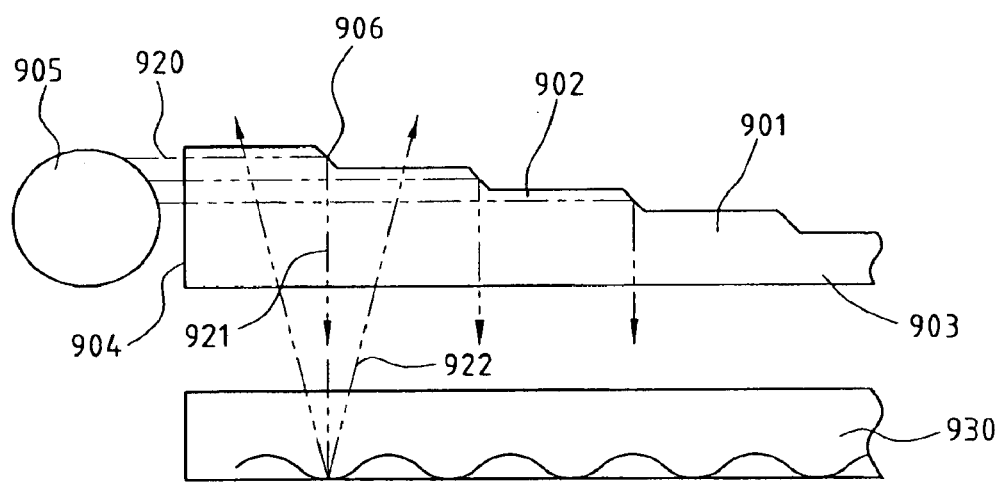
FIG. 1A is a schematic side elevational view of a conventional front light module.
FIG. 1B is a schematic view of a light guide plate of the conventional front light module.
Figure 1B:
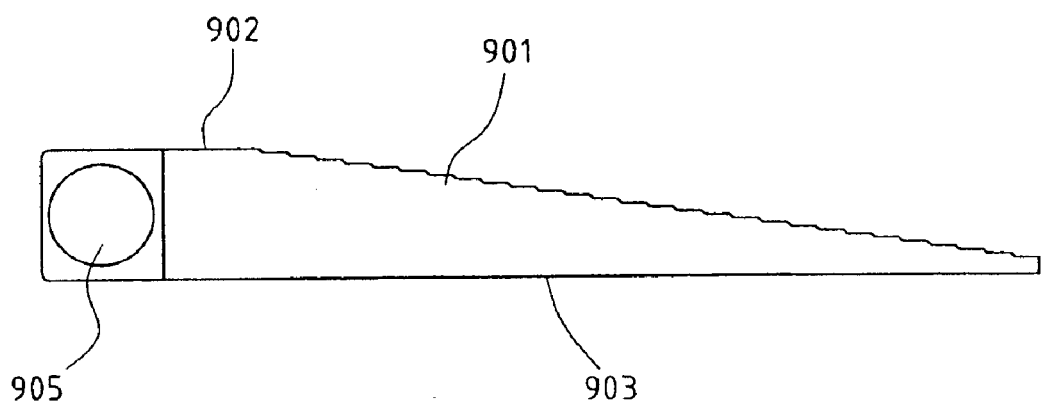

With reference to the drawings and in particular to FIGS. 3–7, a front light module constructed in accordance with the present invention comprises a light guide plate 1 having opposite front and back surfaces 14, 12 connected to each other by end faces 15 to which light sources 51, 53 are mounted. Light emitted from the light sources 51, 53, designated with reference numeral 7, travels through the end faces 15 and into the light guide plate 1. Each light source 51, 53 comprises a lamp reflector 513, 533 attached to the end faces 15 of the light guide plate 1 and at least one light tube 511, 531 fixed inside the lamp reflectors 513, 533 for giving off the light 7 that travels into the light guide plate 1.

The back surface 12 is substantially flat and confronts a reflector 3. A display board comprised of an array of pixels constituted by liquid crystal elements is interposed between the back surface 12 of the light guide plate 1 and the reflector 3. The light 7 that is emitted from the light sources 51, 53 is guided to transmit through the display board and reflected by the reflector 3 for eventually irradiating through the front surface 14.

Figure 5:
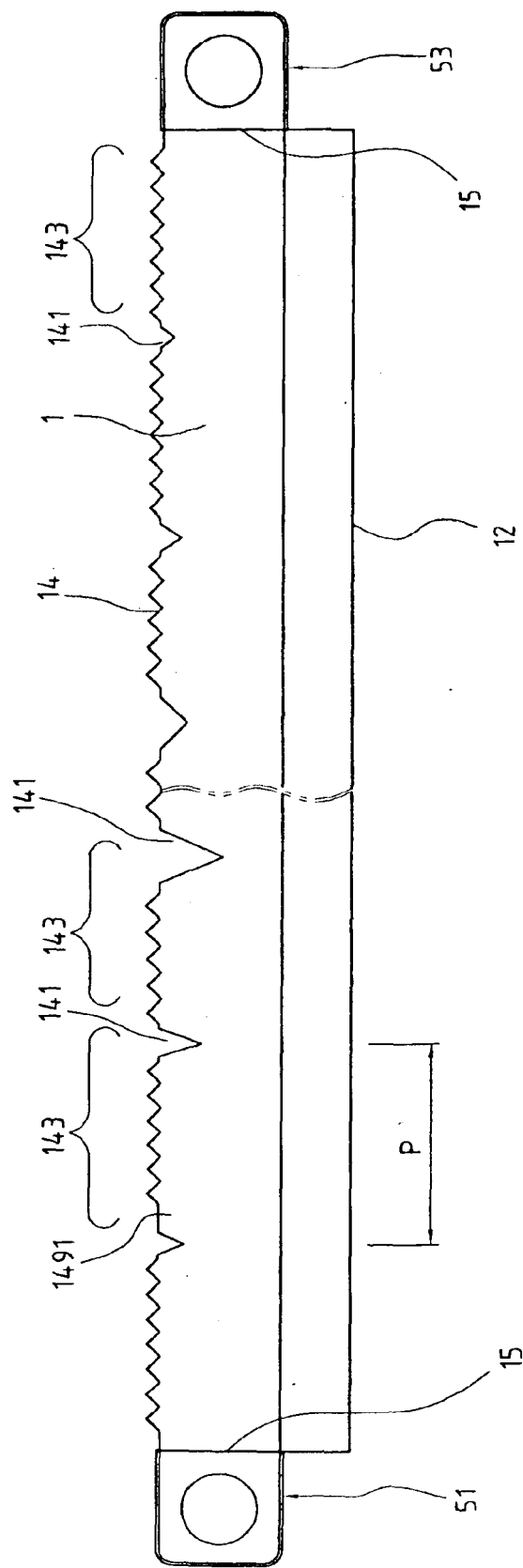
FIG. 5 is a side elevational view of the light guide plate of the front light module of FIG. 3.
Figure 6:
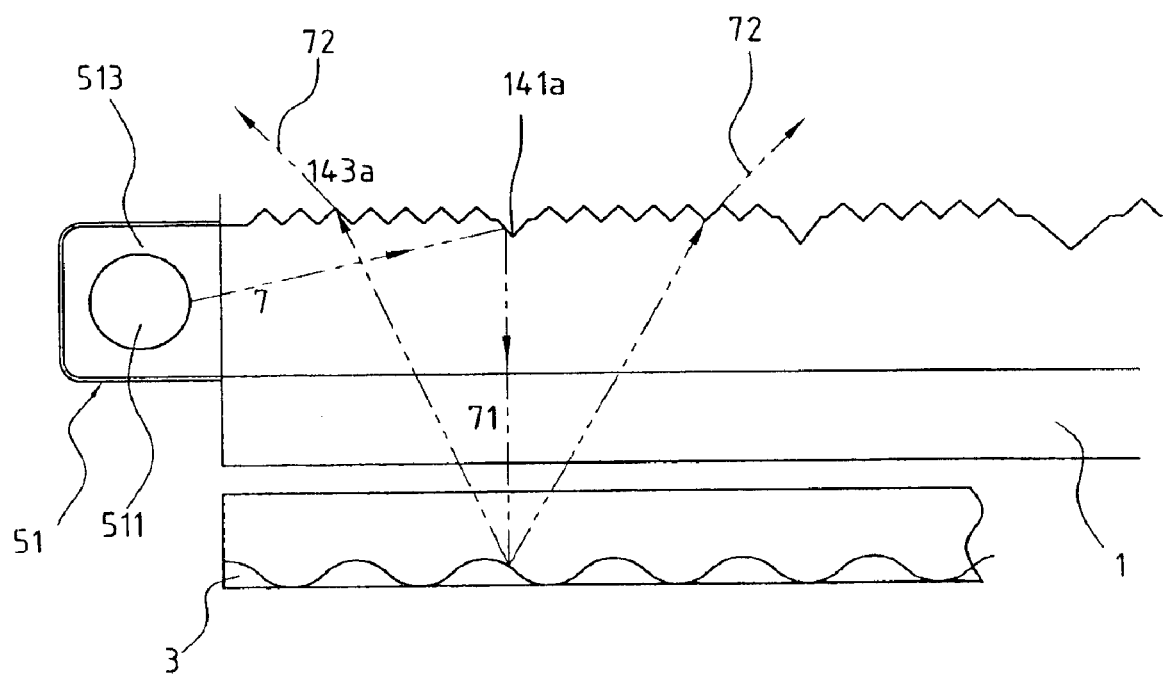
FIG. 6 is a side elevational view of a portion of the front light module of FIG. 3, illustrating the path of light emitted from a light source of the front light module.
Figure 7:
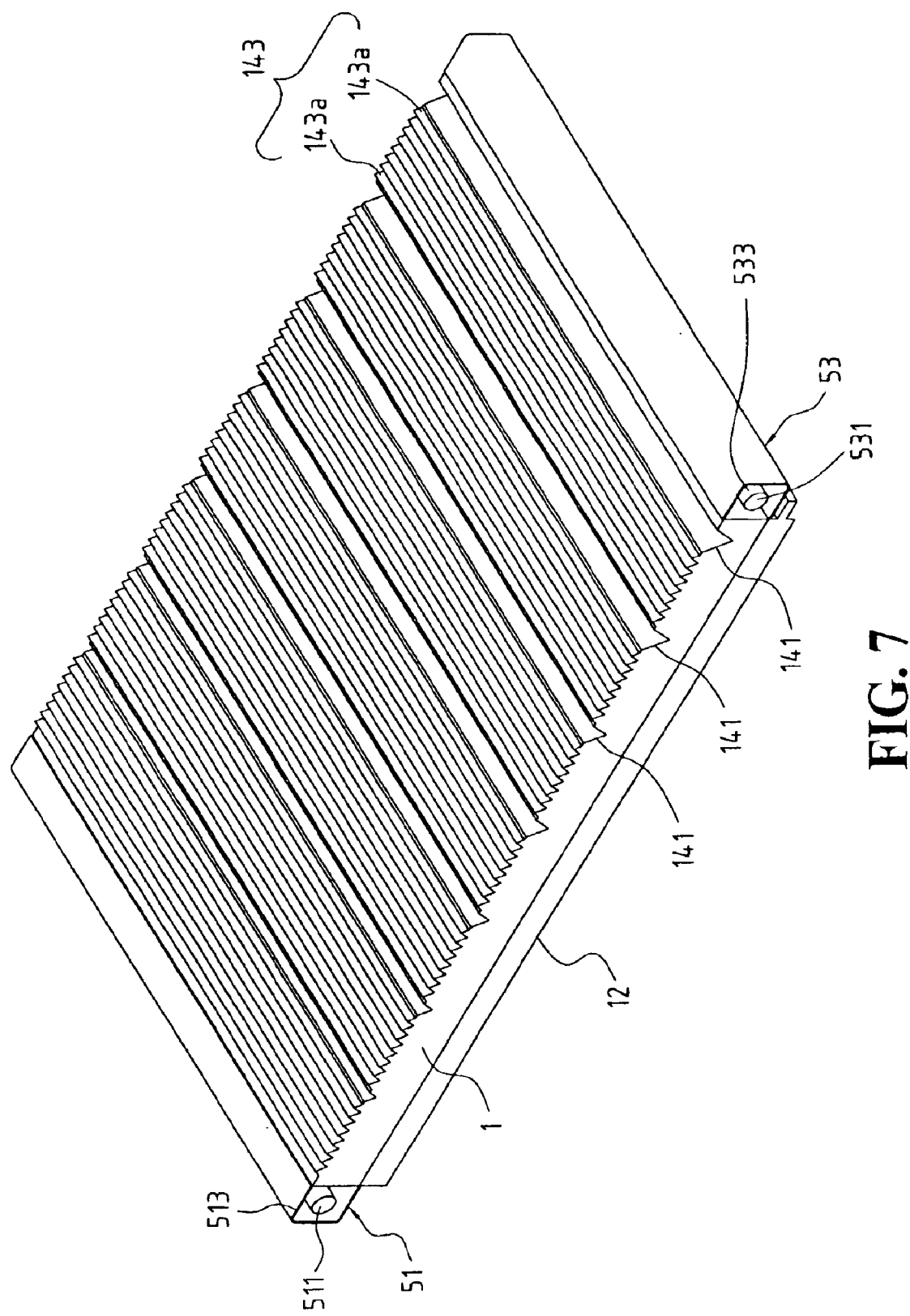
FIG. 7 is a perspective view of the front light module of FIG. 3.

The light guide plate 1 forms a number of sets 143 of raised ridges on the front surface 14. In the embodiment illustrated, each set 143 comprises a number of ridges 143*a* having a triangular cross section functioning as "upper prisms". The triangles 143*a* may have a height around 5 $\mu$m and distance between adjacent triangles 143*a* is around 20–30 $\mu$m. A recessed trough 141 is defined in the front surface 14 between adjacent sets 143 of ridges and the trough 141 functions as a "lower prism". Thus, the lower prisms 141 are spaced from each other by the upper prism sets 143 by a distance P as shown in FIG. 5. A typical value of the distance P is around 50–70mm. In the embodiment illustrated, the trough 141 has a triangular cross section.

Each lower prism 141, having a triangular cross section, has opposite inclined faces 141b, 141c intersecting at an apex 141a. Due to internal total reflection, the light 7 emitting from the light sources 51, 53 and incident onto the inclined faces 141b, 141c are reflected by the inclined faces 141a, 141b of each trough 141 toward and through the back surface 12 as indicated by reference numeral 71. The light 71 travels toward the reflector 3 and reflected thereby as reflected light 72. To ensure a uniform distribution of light throughout the display board, the lower prisms 141 has different sizes or depths and the depths of the lower prisms 141 get larger in a direction from the ends 15 of the light guide plate 1 toward a center of the light guide plate 1. This is clearly observed in FIGS. 3 and 5. The increased depth of the lower prism 141 at the center of the tight guide plate 1 increases surface areas of the inclined faces 141b, 141c which help reflecting more light toward the back surface 12 of the light guide plate 1. Thus, even the light intensity is decreased at the center as compared to the ends 15 where the light sources 51, 53 are mounted, the increased surface areas of the inclined faces 141b, 141c compensate for the decrease of the light intensity and provide uniform brightness over the whole front light module.

Each upper prism 143a comprises two inclined faces 143b, 143c. The light 72 that is reflected from the reflector 3 transmits through the back surface 12 and reaches the front surface 14 where the light is refracted by the inclined faces 143b, 143c of the upper prisms 143a, thereby increasing the viewing angle observed by an observer 950. As illustrated in FIGS. 2–7 it is important to note that the upper prisms are formed by the ridges 143a that are raised above the front surface 14. The edges of the front surface 14 adjacent to the two ends of the light guide plate 1 are substantially flat with the lamp reflectors 513, 533 of the light sources 51, 53 and the raised ridges 143a are higher than the two ends.

The number of the upper prisms 143a in each ridge set 143 may be different from each other. In addition, if desired, a flat section 149 may be selectively formed between the upper prism 143a and the adjacent lower prism 141. The flat section 149 is substantially parallel to the front surface 14 of the light guide plate 1.

Figure 2:
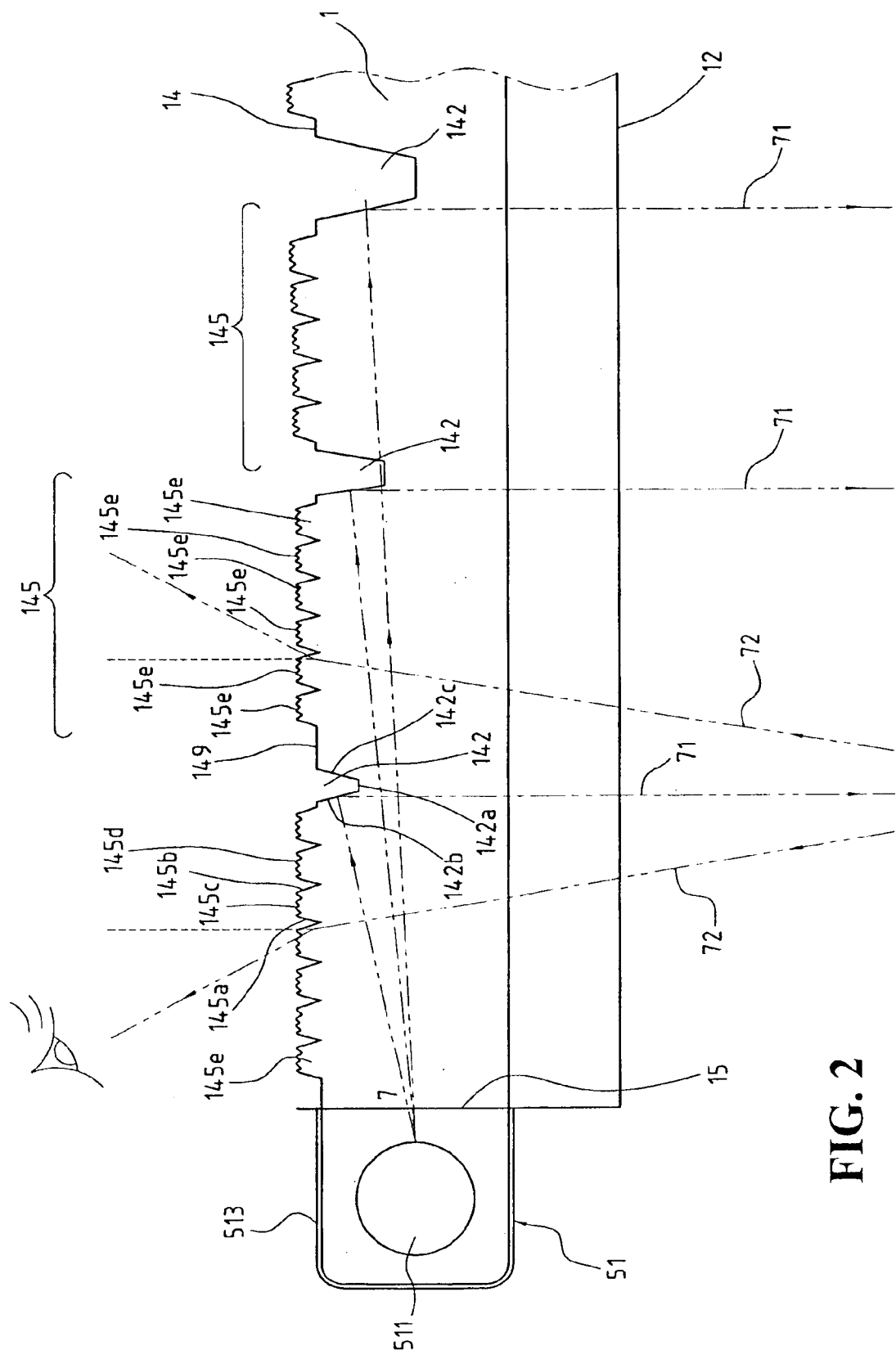
FIG. 2 is a side elevational view of a front light module constructed in accordance with the present invention.
Figure 3:
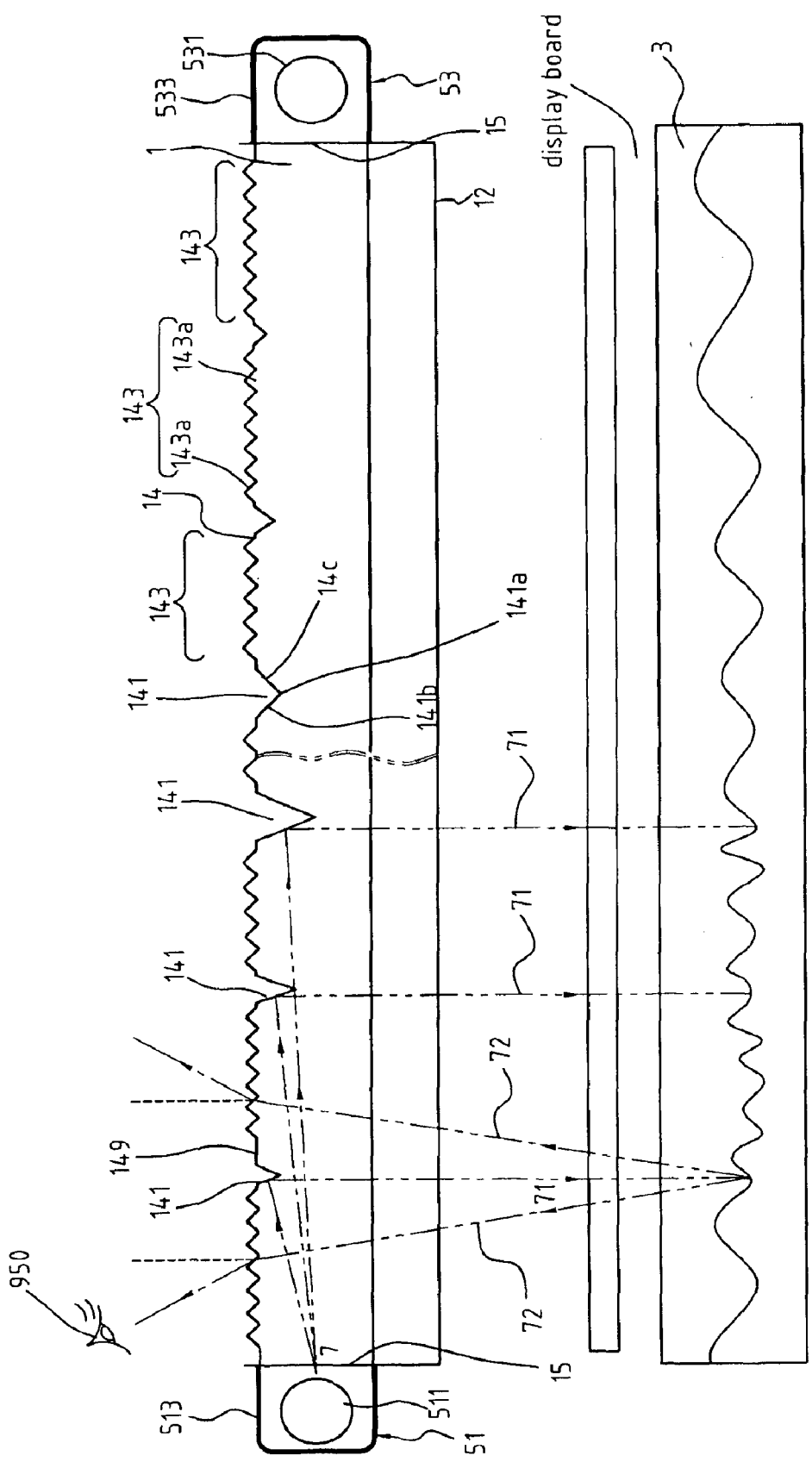
FIG. 3 is a side elevational view of a front light module constructed in accordance with another embodiment of the present invention.
Figure 4:
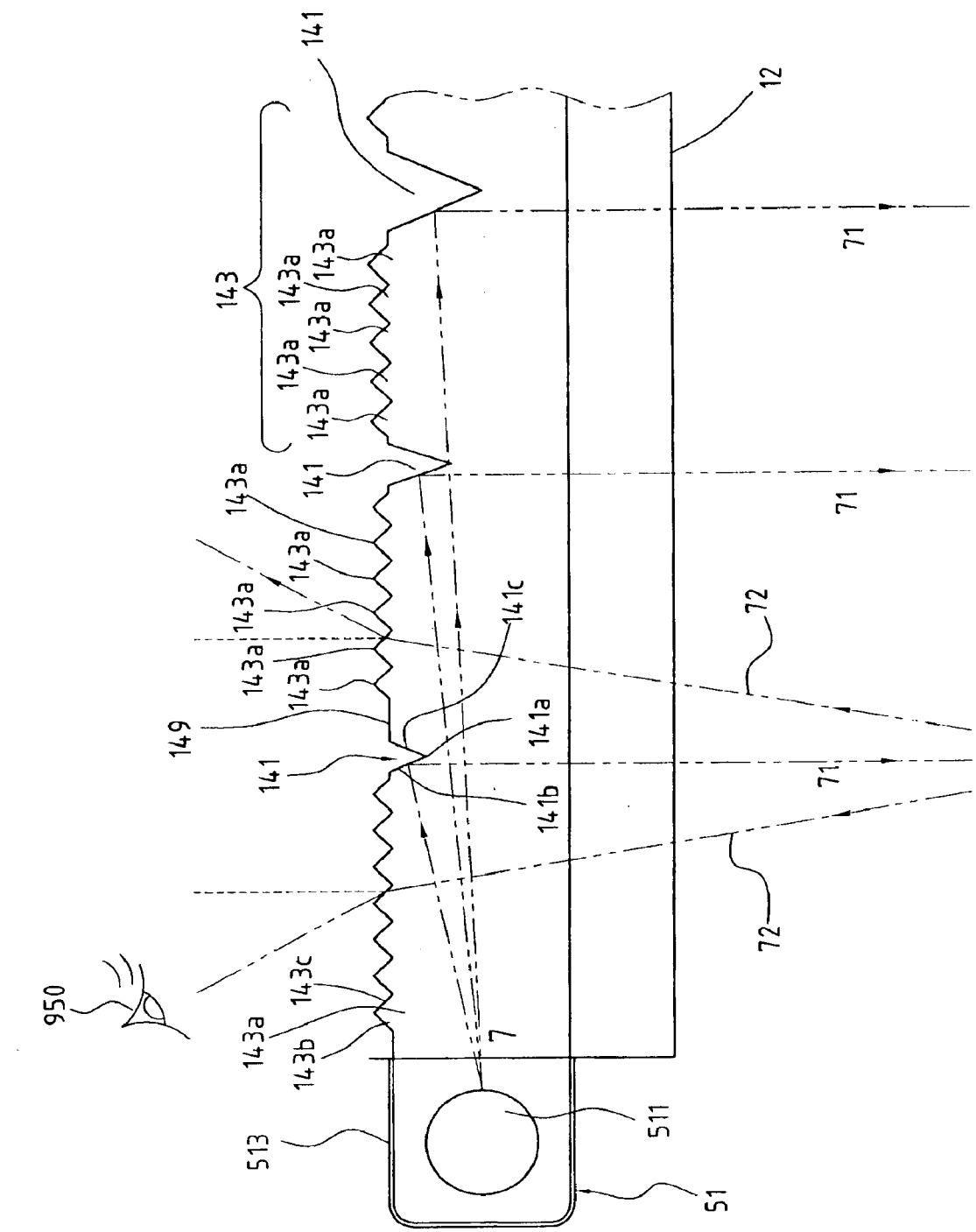
FIG. 4 is an enlarged view of a portion of a light guide plate of the front light module of FIG. 3.

FIG. 2 shows a modification of the light guide plate 1 of the present invention wherein each upper prism 1 that is comprised of a triangular ridge 143a in the embodiment shown in FIGS. 3–7 Is replaced by a trapezoidal ridge 145e formed on the front surface 14 of the light guide plate 1, each trapezoidal ridge 145e comprising opposite inclined side Laces 145a, 145b connected by a top face 145c in which a plurality of ribs 145d is defined. The ribs 145d may have a triangular cross section comprised of opposite inclined faces for refracting the reflected light 72 from the reflector 3. The trapezoidal ridges 145e are grouped in a number of ridge sets 145 that are spaced from each other for accommodating the lower prisms therebetween.

The lower prism 141 that is comprised of a triangular trough in the embodiment shown in FIGS. 3–7 is replaced by a trapezoidal trough 142 having opposite inclined faces 142b, 142c connected by a flat bottom face 142a. The flat face 142a allows for increased distance between the inclined faces 142b, 142c. Thus, the distance between the inclined faces 142b, 142c can be adjusted. This enhances the manufacturing and design flexibility.

Similar to the embodiment shown in FIGS. 3–7, in the embodiment illustrated in FIG. 2, light emitted from a light source 51, which is designated with reference numeral 7, is incident on the inclined faces 1 42b, 1 42c and reflected by the inclined face 142b, 142c as light 71 through the back surface 12 of the light guide plate 1 and toward a reflector (not shown in FIG. 2). The reflector reflects the light 71 as light 72 toward the front surface 14 where the light 72 is refracted by the inclined faces 145a, 145b of the trapezoidal ridges 145c and the ribs 145d on the top face 145c of the ridge 145d. The viewing angle is thus widened.

The trapezoidal troughs 142 defined in the front surface 14 have different depths whereby the trapezoidal troughs 142 at or adjacent to the ends 15 of the light guide plate 1 have the smallest depth, while that at the center of the light guide plate 1 has the largest depth. In other words, the depth of the troughs 142 is increased from the ends 15 of the light guide plate 1 toward the center of the light guide plate 1.

Similarly, a flat section 149 may be present between a ridge set 145 and an adjacent lower prism 142.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A front light module comprising:
a light guide plate having opposite ends, the light guide plate having a front surface and an opposite back surface connected to each other by the ends, a plurality of raised ridge sets formed on the front surface, each ridge set comprising a number of ridges each having opposite inclined faces, and recessed troughs being defined in the front surface between adjacent ridge sets, each trough having opposite inclined faces, wherein the front surface adjacent to the opposite ends is lower than the raised ridge sets;
a light source mounted to each end of the light guide plate for projecting light into the light guide plate; and
a reflector arranged adjacent to and spaced from the back surface of the light guide plate for accommodating a display board between the reflector and the light guide plate;
wherein the light source is positioned lower than the raised ridge sets and the light from the light source is incident onto the inclined faces of the troughs and reflected thereby toward the reflector, the light being reflected by the reflector toward the front surface where the light is refracted by the inclined faces of the ridges to increase viewing angle of a display.

2. The front light module as claimed in claim 1, wherein each ridge has a triangular cross section.

3. The front light module as claimed in claim 1, wherein each ridge has a trapezoidal cross section comprising a top face connecting the inclined faces of the ridge.

4. The front light module as claimed in claim 3, wherein a plurality of ribs is formed on the top face of the ridge.

5. The front light module as claimed in claim 4, wherein each rib has a triangular cross section.

6. The front light module as claimed in claim 1, wherein each trough has a triangular cross section.

7. The front light module as claimed in claim 1, wherein each trough has a trapezoidal cross section having a bottom connecting the inclined faces of the trough.

8. The front light module as claimed in claim 1, wherein the troughs have different depths.

9. The front light module as claimed in claim 8, wherein the depths of the troughs are increased from the ends of the light guide plate toward a center of the light guide plate.

10. A light guide plate having opposite ends to which light sources are mounted to project light into the light guide plate, the light guide plate comprising a front surface and an opposite back surface connected to each other by the ends, a plurality of raised ridge sets formed on the front surface, each ridge set comprising a number of ridges each having opposite inclined faces, and recessed troughs being defined in the front surface between adjacent ridge sets, each trough having opposite inclined faces, wherein the front surface adjacent to the opposite ends is lower than the raised ridge sets and the recessed troughs have different depths.

11. The light guide plate as claimed in claim 10, wherein each ridge has a triangular cross section.

12. The light guide plate as claimed in claim 10, wherein each ridge has a trapezoidal cross section comprising a top face connecting the inclined faces of the ridge.

13. The light guide plate as claimed in claim 12, wherein a plurality of ribs is formed on the top face of the ridge.

14. The light guide plate as claimed in claim 13, wherein each rib has a triangular cross section.

15. The light guide plate as claimed in claim 10, wherein each trough has a triangular cross section.

16. The light guide plate as claimed in claim 10, wherein each trough has a trapezoidal cross section having a bottom connecting the inclined faces of the trough.

17. The light guide plate as claimed in claim 10, wherein the depths of the troughs are increased from the ends of the light guide plate toward a center of the light guide plate.

* * * * *